Jan. 23, 1962  J. A. CHILMAN  3,017,932
CONTROL SYSTEMS FOR AIRCRAFT PROPELLERS
Filed Nov. 18, 1957  3 Sheets-Sheet 1

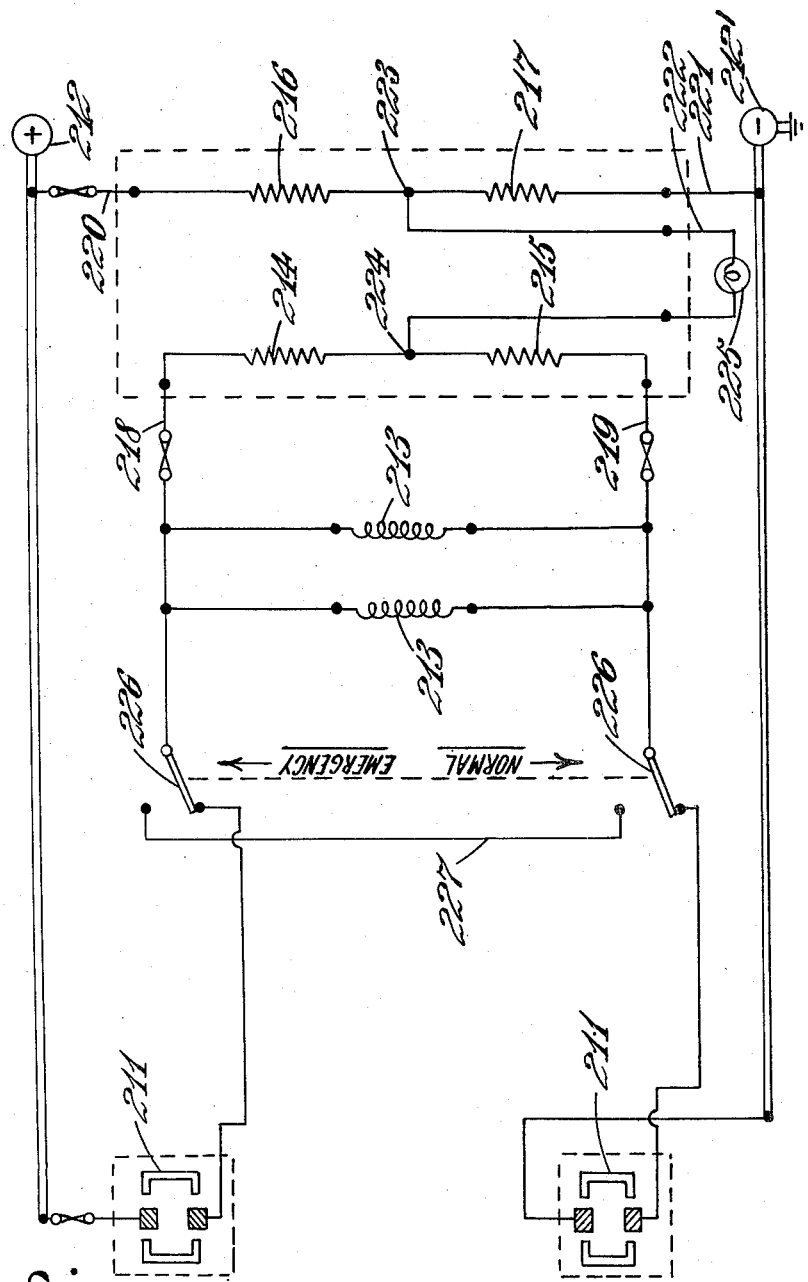

Jan. 23, 1962   J. A. CHILMAN   3,017,932
CONTROL SYSTEMS FOR AIRCRAFT PROPELLERS
Filed Nov. 18, 1957   3 Sheets-Sheet 3
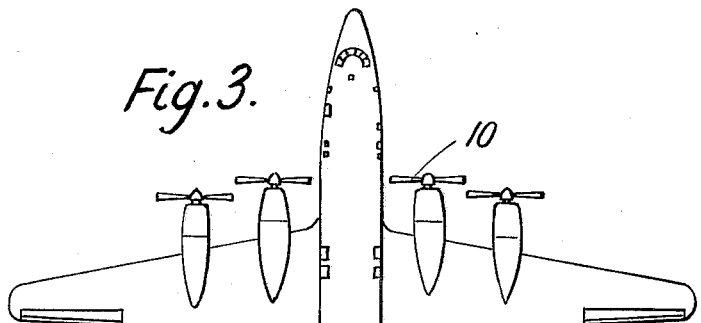
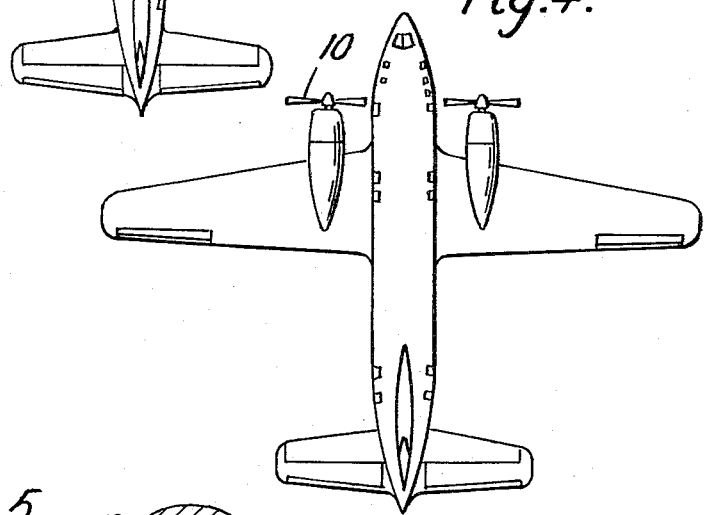
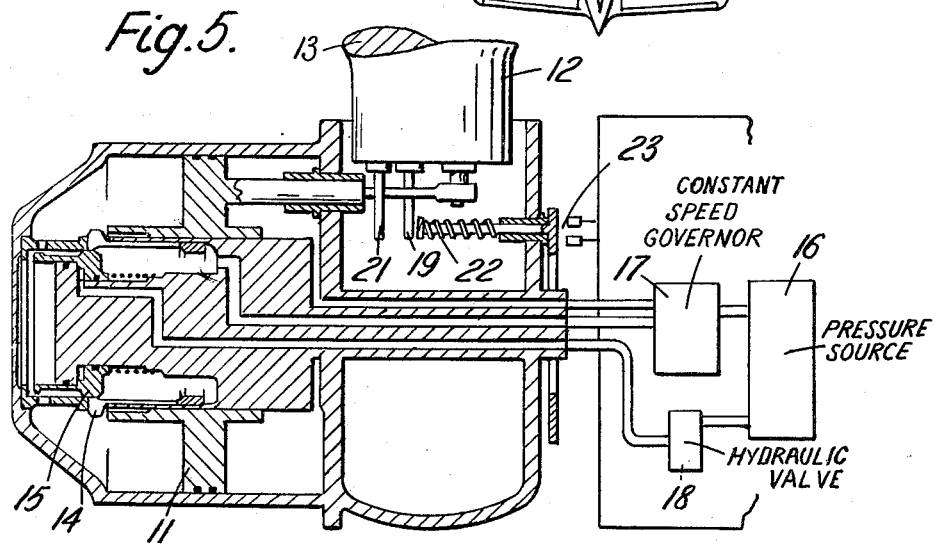

United States Patent Office 3,017,932
Patented Jan. 23, 1962

3,017,932
CONTROL SYSTEMS FOR AIRCRAFT PROPELLERS
John Alfred Chilman, Gloucester, England, assignor to Rotol Limited, Gloucester, England, a British company
Filed Nov. 18, 1957, Ser. No. 697,070
Claims priority, application Great Britain Jan. 10, 1957
3 Claims. (Cl. 170—135.29)

This invention relates to control systems for aircraft propellers.

According to the present invention there is provided, in a multi-engine aircraft having gas-turbine propeller engines, the propellers each including a constant speed unit, and a pitch stop which is operative in flight and which prevents the propeller fining off to an angle such that excessive windmilling speeds can occur in the event of failure of the constant speed unit of the propeller, a control system for the propellers comprising a plurality of sensing means, one for each propeller for sensing when the propeller has fined off to a predetermined pitch at least approaching that set by said pitch stop, the system also comprising control means for withdrawing said pitch stops, said control means being connected with the sensing means of the propellers to operate to withdraw the said pitch stops of all the propellers when all the propellers have fined off to said predetermined pitch.

By "operate to withdraw the stops" is to be understood operate to render the stops inoperative.

In high-speed aircraft, it is desirable not only to have a pitch stop to prevent excessive fining off of a propeller in event of failure of its constant speed unit, but also to provide means whereby all the stops can be rendered inoperative automatically when, say, the aircraft is preparing to land. A control system according to the invention achieves this purpose.

The said pitch stops may be flight cruise stops set for instance to prevent fining off of a propeller to less than about 35°, and a particular application of the invention is to aircraft designed to fly at high speed where the said pitch stops are additional to the conventional flight fine pitch stops which limit the normal flight pitch change range of the propeller, the flight fine pitch stops being set to prevent fining off of a propeller to less than say 22°. It will be appreciated that with high flight speed the fining off of the propeller in the event of failure of a constant speed unit to the flight fine pitch stop may cause excessive windmilling speed. Accordingly the said pitch stops are provided, it being desirable to withdraw the said stops in preparing to land, pitch fining movement of the propellers then being limited only by the flight fine pitch stops.

Said predetermined pitch may be that set by the said pitch stops of the propellers, but, as is now preferred, said predetermined pitch is a small amount greater, for example 2° greater than that set by the said pitch stops of the propellers.

According to a preferred arrangement of this invention, the sensing means for each propeller comprises an electrical propeller-switch which is closed when the propeller is at and below said predetermined pitch, and said control means comprises electro-magnetic means energisable to initiate operation of said control means to withdraw the said pitch stops of all the propellers, and said propeller-switches are connected in series with one another and with said electro-magnetic means energisable to initiate operation of said control means to withdraw the said pitch stops of all the propellers, and said propeller-switches are connected in series with one another and with said electro-magnetic means through manually operable switch means operable at will to isolate the electro-magnetic means. Thus unless and until all the propellers have fined off to said predetermined pitch and all the propeller-switches are closed, the electro-magnetic means cannot be energised and the stops will not automatically be withdrawn. Furthermore by operating the manually operable switch means the "automatic" stop withdrawal circuit may be selectively rendered inoperative.

Preferably also, said electro-magnetic means comprises a plurality of solenoids, one for each propeller, said solenoids being connected in parallel with one another, and energisable each to initiate the operation of said control means to withdraw said pitch stop of one of the propellers.

In another form of the invention said manually operable switch means is additionally operable at will to isolate said propeller switches from said electro-magnetic means and to energise said electro-magnetic means. Thus if the automatic means for withdrawing the said pitch stops does not operate the pilot is able to energise the electro-magnetic means to withdraw the stops also by operating the manually operable switch means.

With the arrangement defined in the next but one preceding paragraph, since the "manual circuit" is separate of the "automatic" circuit, failure of the automatic circuit cannot affect the operation of the manual circuit to withdraw the stops.

According to a feature of the present invention, the sensing means for each propeller may be adapted also to sense when the propeller is feathered, and in this case said control means is connected with the sensing means of the propellers to operate to withdraw the said pitch stops of all the propellers when one or more of the propellers is feathered and the remaining propellers have fined off to said predetermined pitch. Thus the propeller-switch for each propeller may also be closed when the propeller is feathered whereby said electromagnetic means is energised when the remaining propellers have fined off to said predetermined pitch.

A control system according to the invention, since it is automatic in operation, relieves the pilot of the responsibility of ensuring that the said pitch stops are withdrawn when required. It will be appreciated, however, that in the event of failure of one of the propeller-switches, none of the said pitch stops would be withdrawn. In view of this is is desirable that the control system include warning means for indicating the failure of any one of the propeller-switches to close when all the propellers have fined off to said predetermined pitch.

To this end, according to another feature of the present invention, the control system may further comprise an electrically operable indicating means and two electric supply circuits therefor, which supply circuits are connected to the indicating means in opposition and are controlled one by at least one of said propeller-switches and the other by all the other of said propeller-switches, whereby said indicating means is operated only when one of said propeller switches controlling one of said supply circuits fails to close when all of said propeller-switches controlling the other supply circuit are closed.

Further features of the present invention will become apparent from the following description of two specific embodiments of the invention which are described merely by way of example, and with reference to the accompanying drawings, in which:

FIGURE 2 shows another control system according to the invention.

FIGURE 3 shows a four engine gas turbine propeller driven aircraft adapted to fly at high speeds and incorporating the control system of FIGURE 1;

FIGURE 4 shows a two engine gas turbine propeller driven aircraft adapted to fly at high speeds and incorporating the control system of FIGURE 2; and FIGURE 5 shows a section through a propeller of the aircraft of either FIGURE 3 or FIGURE 4.

Figure 1:
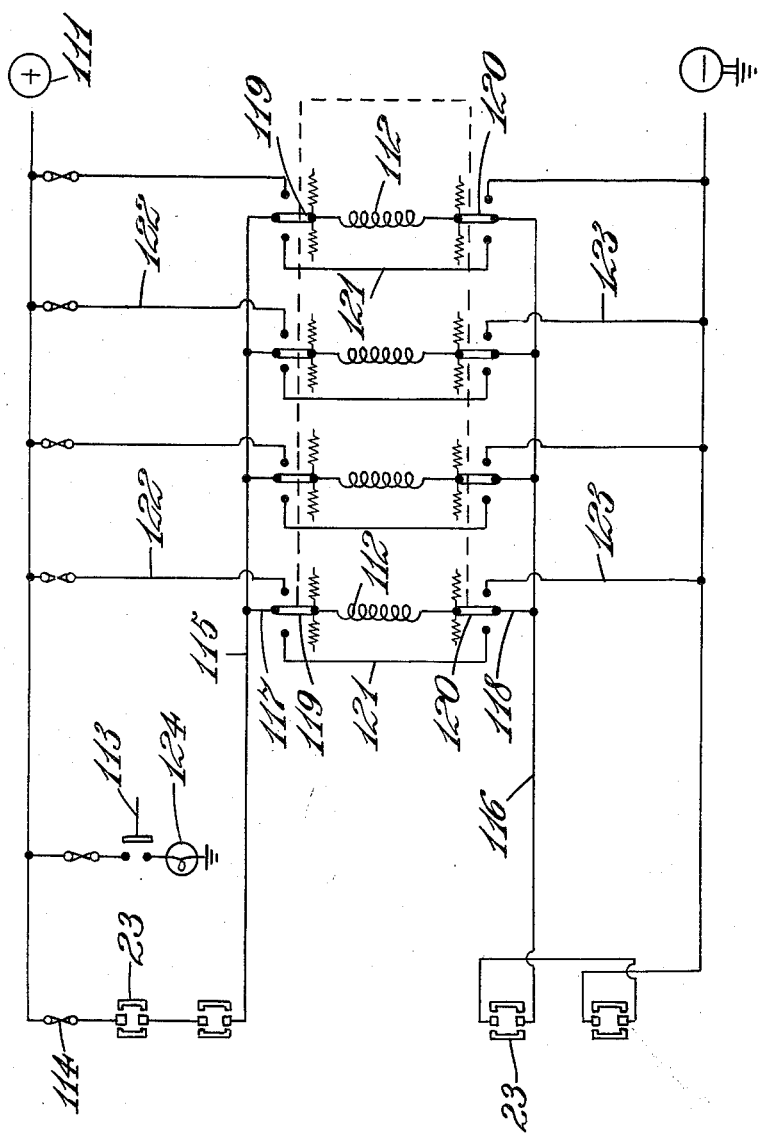
FIGURE 1 shows one control system according to the invention.

The propellers 10 of both of the two aircraft of FIGURES 3 or 4 are variable pitch propellers operated by movement of a ram 11 of a pitch change motor. This ram 11 is connected to the roots 12 of the blades 13 of the propeller in known manner. A set of pitch stops 14 project into the path of movement of the ram 11 which prevents the propeller decreasing to a pitch less than about 35°. These pitch stops 14 are held in position by the periphery of a second piston 15. This piston 15 can be operated by pressure fluid from a source of pressure 16 which operates the pitch change motor through a constant speed governor 17. The supply of pressure fluid to the piston 15 is controlled by a hydraulic valve 18 under the influence of an electric solenoid. Mounted on to the root of one blade of each propeller is a pair of tubular cams 19, 21 which abut against a rod 22 to close a switch 23. The cams 19, 21 are provided so located that on movement of the propellers into a position defined by the flight pitch stop, and below that pitch, the cam 19 will abut the rod 22 to close the switch 23, and, when on the other hand, the blade is moved to its feathering position the cam 21 will abut the rod 22 to close the switch 23. The switches 23 are connected in series with one another in a series circuit containing a source of electric current 111, the switches 23 being connected in series with stop withdrawing means, constituted by electro-magnetic means, through manually operable switch means.

The electro-magnetic means comprises, for each propeller an electric solenoid, the coils of which are indicated at 112, energisable to operate hydraulic valve 18 thereby to initiate the withdrawal of the flight cruise stop of the propeller. The coils 112 are connected in parallel in the series circuit containing the switches 23 being arranged in two pairs, one on the positive side of the solenoid, that is to say in line 115, and the other on the negative side of the solenoids, that is to say in line 116.

The manually operable switch means comprises two banks of four switches all of which are ganged together for common operation, one bank 119 of these switches being provided on the positive side of the coils 112 and the other bank 120 of these switches being provided on the negative side of the coils 112.

Each of the switches 119 and 120 is a three position switch which, in its central position, connects its associated coil 112 with the line 115 or the line 116 through lines 117 and 118.

When the switches 119 and 120 are set in their central position as shown in the drawing, the system is set for automatic withdrawal of the flight cruise stops once all of the switches 23 have been closed.

An indicator lamp, such as 124 may be associated with each propeller, the lamp being arranged to light when the flight cruise stop of its propeller is withdrawn. To this end the arrangement described my co-pending United States patent application Serial No. 681,644 filed September 3, 1957 now Patent No. 2,934,154 and assigned to instant assignee may be adopted in respect of each propeller for indicating when the flight cruise stop of the propeller has been withdrawn.

The switches 119 and 120 may all be moved together to an emergency position, to the left in the drawing, to bring each of the coils 112 into a guarded circuit with lines 121 whereby all the coils 112 are completely isolated and withdrawal of the flight cruise stops cannot take place.

The switches 119 and 120 may also all be moved together, to the right in the drawing, to isolate the switches 23 and bring each coil 112 into circuit with independent lines 122 and 123 whereby each coil is individually energised to initiate the withdrawal of the flight cruise stop 14 of the propeller 10 with which it is associated.

The switches 119 and 120 are all provided with spring means biasing them from the manual position to their central position as shown in the drawing so that they normally assume their central position.

The series circuit containing the switches 110 also includes a main fuse 114 and a fuse is also included in each of the lines 122.

With the control system described, it will be seen that if an open circuit fault occurs in line 115 when the switches 119 and 120 are in their central position, that is to say, set for automatic withdrawal of the flight stops, automatic withdrawal of the flight stops 14 cannot, in fact, take place. This will be indicated to the pilot, however, by the failure of the indicator lamp or lamps 124 to come on and the pilot may then adjust the switches 119 and 120 manually, to the right in the drawing, so as to energise the individual circuits of each of the coils 112 to initiate the withdrawal of the flight cruise stops.

If an open circuit fault occurs in line 116, or say one of the lines 117 or 118, when the switches 119 and 120 any in their central position, the indicator lamp or lamps 124 will also fail to come on and the pilot will thereby be made aware that it is necessary for him to operate the switches 119 and 120 manually in order to withdraw all the flight cruise stops.

If a short circuit occurs in one of the coils 112 this will cause the main fuse 114 to blow thereby rendering the "automatic" circuit inoperative. The pilot may then operate the switches 119 and 120 manually to energise the remaining coils 112.

If one of the engine propeller units fails, and the propeller of the unit is feathered, the switch 23 associated with the propeller will be closed thereby setting the automatic circuit for operation to withdraw all the flight cruise stops of the other propellers in as far as the feathered propeller controls the withdrawal of the same. The flight cruise stops are therefore withdrawn automatically as soon as the remaining propellers are fined off on to their flight cruise stops. If more than one of the propellers is feathered similar considerations apply.

The control system shown in FIGURE 2 is for the propellers of the two-engined gas-turbine propeller aircraft of FIGURE 4.

The four propeller switches 23 are numbered 211 for description of this control system. The switches 211 are connected in a series circuit containing a direct current source 212, this circuit incorporating electromagnetic means connected between the two switches 211. The electromagnetic means comprise, for each propeller, an electric solenoid, the coils of which are indicated at 213. The coils 213 are connected in parallel with one another and each coil when energised operates hydraulic valve 18 to initiate the withdrawal of the flight cruise stop of its associated propeller.

With the circuit so far described, it will be seen that when the switches 226 (later described) are in their position as shown in the circuit diagram, and the switches 211 are closed, the coils 213 are energised to initiate the withdrawal of both the flight cruise stops 14. It will furthermore be seen that the flight cruise stops 14 are not withdrawn until both propellers 10 are on their flight stops because only then will both the switches 211 be closed.

Arranged in parallel with the coils 213 is an electrical bridge comprising four resistances 214, 215, 216 and 217. The bridge is connected with the circuit in the following way. Two leads 218 and 219 are taken to resistances 214 and 215 respectively, these resistances being connected together as shown. Two further leads 220 and 221 are respectively taken from the positive and negative sides of the circuit to the resistances 216 and 217. Resistances 216 and 217 are joined together as shown, and a lead 222 is taken from the junction 223 between these two resistances to the junction 224 between the resistances 214 and 215. Lead 222 incorporates electrically operable indicating means in the form of a warning lamp 225.

Incorporated on the positive side of the circuit in the lead between switch 211 and the coils 213 is a switch 226, a similar switch 226 being incorporated in the lead on the negative side. The switches 226 may be moved together from their normal operating position as drawn, to an emergency position in which both coils 213 are isolated in a guarded circuit 227 so that automatic initiation of the withdrawal of the flight cruise stops cannot take place.

It is arranged that the values of the resistances 214, 215, 216 and 217, are such that when the switches 211 are both closed and thus the coils 213 are energised, equal potentials appear at the junctions 223, 224 so that the warning lamp 225 does not light.

This is because, in effect, two supply circuits are provided for the lamp 225, the first, from 212, through the upper switch 211 in the circuit diagram, the upper switch 226 in the circuit diagram, the lead 218, the resistance 214, the lead 222, the resistance 217, and the lead 221, to 212′, and the second from 212, through the lead 220, the resistance 216, the lead 222, the resistance 215, the lead 219, the lower switch 226 in the circuit diagram, and the lower switch 211 in the circuit diagram, and these supply circuits are in opposition to one another.

If, however, when each propeller has fined off on to its flight stop the hub switch 211 on the positive side of the coils 213 is closed, but due to a mechanical fault the hub switch 211 on the negative side of the coils has not closed, a difference of potential appears between the junctions 223 and 224 and the warning lamp 225 lights up. Conversely, if the switch 211 on the positive side of the coils 213 does not close, and the other switch 211 does not close the lamp 225 will again light. This is because when one only of the switches 211 closes, only one of the supply circuits traced above is completed, the circuit then being able to energise the lamp 225 in the absence of an equal and opposite energisation from the other supply circuit, which, being controlled by the other switch 211, is not completed because the other switch has not closed.

If one propeller fines off on to its flight cruise stop before the other, it will be seen that the lamp 225 will light, but this will occur only momentarily since as soon as the other propeller fines off on to its flight cruise stop the lamp will go out thereby indicating to the pilot that both the switches 211 have closed to initiate the withdrawal of the flight cruise stops.

If the lamp 225 lights however and is not subsequently extinguished this will warn the pilot of a failure of one of the switches 211 to operate so that he may manually initiate the withdrawal of the flight cruise stops, for example, by initiating hydraulic bypassing of the electric solenoids.

The warning system incorporating the lamp 225 is also operative to indicate when one of the switches 211, after the switches 211 have been closed fails to open again when the other switch 211 has opened. Thus following the starting of the engines for example, and during coarsening of the propellers into the flight pitch change range above the flight cruise stops, if the switch 211 of one of the propellers jams in the closed position the warning light will come on. This will inform the pilot of the failure of one of the switches 211 to open, with the implication that if he fines off one of the propellers on to its flight cruise stop there is the possibility that the flight cruise stops will be withdrawn with the result that the propeller will be free to move into the pitch change range below its flight cruise stop. Such movement, where unintentional, may have serious consequences but is ensured against by the warning system described.

In the event of both switches 211 failing to open, the warning system described would then be inoperative to warn the pilot that anything was amiss, although the flight cruise stops would of course remain withdrawn. However, the propeller system may include for each propeller a "flight cruise stop withdrawn" indicator as fully described in the specification my co-pending United States patent application Serial No. 681,644. If both switches 211 fail to open, the flight cruise stop withdrawn indicators wil be energised, thus warning the pilot that the propeller blades must not be moved in the pitch fining direction to the flight cruise stop until the manual switch 226 has been moved to the emergency position.

Although the control systems described are applied to the automatic withdrawal of flight cruise stops of the propellers of a multi-engined aircraft having gas-turbine propeller engines, it will be appreciated that the control systems may be applied for the automatic withdrawal of any other set of corresponding pitch fining stops which are incorporated in the propellers of a multi-engined aircraft having gas-turbine propeller engines.

The control system described with reference to FIGURE 2 may also be applied to an aircraft having more than two gas-turbine propeller engines. In this case, a further switch 211 as previously described is provided for each additional propeller, the further switch or switches being connected in series with the switches 211 shown in the circuit diagram so that each switch 211 controls the energisation of the electromagnetic means, which in this case will comprise a further solenoid for each additional propeller, the coil or coils of which will be connected in parallel with the coils 213 shown in the circuit diagram.

In the case where there is more than one additional switch 211 these may be connected all on one side of the electromagnetic means. Preferably, however, they are distributed between the positive and negative sides of the electromagnetic means, since this reduces the possibility that where a switch 211 on one side of the electromagnetic means fails to close when its propeller fines off on to its relevant stop, a switch 211 on the other side of the electromagnetic means will also fail to close. In these circumstances it will be appreciated that the lamp 225 will not light to warn the pilot of the switch failure.

As previously described, each switch 211 is adapted also to be closed when its associated propeller is feathered. This ensures that where a propeller is feathered, the electromagnetic means will be set for energisation as far as the switch 211 of that propeller is concerned. The electromagnetic means will then be energised to withdraw the relevant stops of all the propellers as soon as the unfeathered propeller or propellers is or are fined off on to the stops.

Instead of arranging for the propeller-switches to close when the propellers have fined off on to their flight cruise stops, as with all the examples described each switch may be adapted to close when the propeller associated with the swicth has fined off to a pitch angle which is a predetermined amount greater, for example 2° greater, than the pitch angle set by the flight cruise stop.

The warning system incorporating the electrical bridge comprising the four resistances 214, 215, 216 and 217 may be employed in the circuit of the second example instead of the warning ssytems described with reference thereto.

I claim:

1. In a multi-engined aircraft having a plurality of gas turbines, a plurality of variable pitch propellers one driven by each engine, a plurality of constant speed units one connected to each propeller to control the speed thereof by pitch variation, a plurality of pitch stops one in each propeller and each movable between an operative position in which it sets a limit on the reduction of pitch of its propeller and an inoperative position, and a plurality of pitch stop withdrawal means one connected to each pitch stop and each operable to move its pitch stop to the inoperative position; a pitch stop control system having an electric circuit comprising a source of electric power, a plurality of electro-magnetic means one connected with each of said pitch stop withdrawal means so that operation of each of said pitch stop withdrawal means is initiated when its electro-magnetic means is energized by said source of electric power, said plurality of electro-magnetic means being all connected in parallel with one another, a plurality of electric switches in series with one another and with said source of electric power and said plurality of electro-magnetic means, said plurality of switches being connected one with each of said plurality of propellers to be closed when the pitch of its propeller is reduced to a predetermined pitch at least approaching that set by the pitch stop of the propeller and to remain closed if and when the pitch of its propeller is further reduced, and said plurality of electric switches being arranged in two banks, one bank in series between said source of electric power and said plurality of electro-magnetic means on one side of said plurality of electro-magnetic means and the other bank in series between said source of electric power and said plurality of electro-magnetic means on the other side of said plurality of electro-magnetic means, said system further comprising a plurality of pairs of electric conductors one pair for each electro-magnetic means, one conductor of each pair being connected between its electro-magnetic means and said source of electric power in parallel with one of said banks and the other conductor of each pair being connected between its electro-magnetic means and said source of electric power in parallel with the other of said banks, and a manually operable switch means in series between said source of electric power and said plurality of electro-magnetic means, which manually operable switch means comprises a plurality of pairs of switches one pair for each electro-magnetic means, which switches are all ganged together for simultaneous operation, between a first position and a second position, one switch of each pair being connected so that in the first position it connects one end of its electro-magnetic means in series with one of said banks and in the second position it connects the one end of its electro-magnetic means in series with one conductor of the one of said plurality of pairs of electric conductors which is associated with its electro-magnetic means, and the other switch of each pair being connected so that in the first position it connects the other end of its electro-magnetic means in series with the other of said banks and in the second position it connects the other end of its electro-magnetic means in series with the other conductor of the one of said plurality of pairs of electric conductors which is associated with its electro-magnetic means.

2. In a multi-engined aircraft having a plurality of gas turbines, a plurality of variable pitch propellers one driven by each engine, a plurality of constant speed units one connected to each propeller to control the speed thereof by pitch variation, a plurality of pitch stops one in each propeller and each movable between an operative position in which it sets a limit on the reduction of pitch of its propeller and an inoperative position, and a plurality of pitch stop withdrawal means one connected to each pitch stop and each operable to move its pitch stop to the inoperative position; a pitch stop control system having an electric circuit comprising a source of electric power, a plurality of electro-magnetic means one connected with each of said pitch stop withdrawal means so that operation of each of said pitch stop withdrawal means is initiated when its electro-magnetic means is energized by said source of electric power, said plurality of electro-magnetic means being all connected in parallel with one another, a plurality of electric switches in series with one another and with said source of electric power and said plurality of electro-magnetic means, said plurality of switches being connected one with each of said plurality of propellers to be closed when the pitch of its propeller is reduced to a predetermined pitch at least approaching that set by the pitch stop of the propeller and to remain closed if and when the pitch of its propeller is further reduced, and said plurality of electric switches being arranged in two banks, one bank in series between said source of electric power and said plurality of electro-magnetic means on one side of said plurality of electro-magnetic means and the other bank in series between said source of electric power and said plurality of electro-magnetic means on the other side of said plurality of electro-magnetic means, said system further comprising a plurality of pairs of electric conductors one pair for each electro-magnetic means, one conductor of each pair being connected between its electro-magnetic means and said source of electric power in parallel with one of said banks and the other conductor of each pair being connected between its electro-magnetic means and said source of electric power in parallel with the other of said banks; a manually operable switch means in series between said source of electric power and said plurality of electro-magnetic means, which manually operable switch means comprises a plurality of pairs of switches one pair for each electro-magnetic means, which switches are all ganged together for simultaneous operation, between a first position and a second position, one switch of each pair being connected so that in the first position it connects one end of its electro-magnetic means in series with one of said banks and in the second position it connects the one end of its electro-magnetic means in series with one conductor of the one of said plurality of pairs of electric conductors which is associated with its electro-magnetic means, and the other switch of each pair being connected so that in the first position it connects the other end of its electro-magnetic means in series with the other of said banks and in the second position it connects the other end of its electro-magnetic means in series with the other conductor of the one of said plurality of pairs of electric conductors which is associated with its electro-magnetic means; and a pluraltiy of further electric conductors one for each electro-magnetic means, said plurality of pairs of switches of said manually operable switch means being ganged together for simultaneous further operation to and from a third position wherein each of said pairs of switches connects its electro-magnetic means in a guarded circuit with the one of said further electric conductors associated with the electro-magnetic means.

3. In a multi-engined aircraft having a plurality of gas turbines, a plurality of variable pitch propellers one driven by each engine, a plurality of constant speed units one connected to each propeller to control the speed thereof by pitch variation, a plurality of pitch stops one in each propeller and each movable between an operative position in which it sets a limit on the reduction of pitch of its propeller and an inoperative position, and a plurality of pitch stop withdrawal means one connected to each pitch stop and each operable to move its pitch stop to the inoperative position; a pitch stop control system having an electric circuit comprising a source of electric power, a plurality of electro-magnetic means one connected with each of said pitch stop withdrawal means so that operation of each of said pitch stop withdrawal means is initiated when its electro-magnetic means is energized by said source of electric power, said plurality of electro-magnetic means being all connected in parallel with one another, a plurality of electric switches in series with one another and with said source of electric power and said plurality of electro-magnetic means, said plurality of switches being connected one with each of said plurality of propellers to be closed when the pitch of its propeller is reduced to a predetermined pitch at least approaching that set by the pitch stop of the propeller and to remain closed if and when the pitch of its propeller is further reduced, a manually operable switch means in series between said source of electric power and said plurality of electro-magnetic means, a first electric bridge connected in parallel with said plurality of electro-magnetic means and having a first tapping point, a second electric bridge connected across said source of electric power and having a second tapping point, said electric bridges being matched so that when said plurality of electro-magnetic means are connected to be supplied from said source of electric power there is zero potential difference between said first tapping point and said second tapping point, and electrically operated indicating means connected between said first tapping point and said second tapping point.

References Cited in the file of this patent
UNITED STATES PATENTS 2,593,910     Morris et al. _____ Apr. 22, 1952